US012790061B2

(12) United States Patent
Giuliani et al.

(10) Patent No.: US 12,790,061 B2
(45) Date of Patent: Nov. 10, 2026

(54) LABELLING MODULE CONFIGURED FOR LABELLING WITH PARTIAL LABELS

(71) Applicant: SIDEL PARTICIPATIONS, Octeville-Surmer (FR)

(72) Inventors: Mattia Giuliani, Mantova (IT); Marco Ferri, Mantova (IT)

( * ) Notice: Subject to any disclaimer, the term of this patent is extended or adjusted under 35 U.S.C. 154(b) by 0 days.

(21) Appl. No.: 18/873,132

(22) PCT Filed: Sep. 29, 2022

(86) PCT No.: PCT/EP2022/077083

§ 371 (c)(1),
(2) Date: Dec. 9, 2024

(87) PCT Pub. No.: WO2024/067969

PCT Pub. Date: Apr. 4, 2024

(65) Prior Publication Data

US 2025/0361049 A1 Nov. 27, 2025

(51) Int. Cl.
*B65C 9/18* (2006.01)
*B65C 9/20* (2006.01)

(52) U.S. Cl.
CPC .............. *B65C 9/1819* (2013.01); *B65C 9/20* (2013.01); *B65C 2009/1834* (2013.01)

(58) Field of Classification Search
CPC . B65C 9/1819; B65C 9/20; B65C 2009/1834; B65C 2009/1838
See application file for complete search history.

(56) References Cited

FOREIGN PATENT DOCUMENTS

EP 3919397 A1 * 12/2021 ........... B65C 9/1819

OTHER PUBLICATIONS

Machine Translation of EP3919397 (Year: 2021).*
International Search Report and Written Opinion for PCT/EP22/77083 dated Jun. 5, 2023.

* cited by examiner

*Primary Examiner* — Daniel Mcnally

(57) ABSTRACT

Provided is a labelling module for labelling containers adapted to contain a pourable product, the labelling module having a feed roller for advancing a web of labelling material along a feed path; a cutting member downstream of the feed roller for repeatedly cutting the web to separate a sequence of labels therefrom; and a transfer drum rotatable about a rotation axis in an angular direction of rotation, and configured to transfer the labels to an application station for the application thereof onto the respective containers; the transfer drum includes a plurality of receiving sectors each configured to cyclically receive and retain a label, the receiving sectors including a leading pad for retaining a leading edge of the label and a trailing pad for retaining a trailing edge of the label.

14 Claims, 3 Drawing Sheets

LABELLING MODULE CONFIGURED FOR LABELLING WITH PARTIAL LABELS

CROSS-REFERENCE TO RELATED APPLICATIONS

This application is a 371 U.S. National Stage Application of PCT Application Serial Number PCT/EP2022/077083 filed on Sep. 29, 2022, entitled "LABELLING MODULE CONFIGURED FOR LABELLING WITH PARTIAL LABELS," the entire contents of which are hereby incorporated herein by reference.

TECHNICAL FIELD

The present invention relates to a labelling module for labelling articles, by means of labels obtained from a web of labelling material, adapted to contain a pourable product, preferably a pourable food product.

BACKGROUND ART

Labelling machines are known, which are commonly used to prepare, transport and apply labels onto articles, such as bottles, flacons or containers of this sort, destined to be filled with a pourable product, in particular a pourable food product.

Particularly widespread is the use of glued labels, i.e. portions of a labelling material that are cut at appropriate lengths from a web of labelling material initially wound in form of continuous strip around one or more storage reels and then sprinkled with glue.

In detail, the web of labelling material is progressively unwound off the relative reel and then repeatedly cut to obtain successive labels of equal length, upon which glue is applied by gluing means, such as a gluing roller, spray or injector systems or the like.

Eventually, the labels so obtained are conveyed and applied onto the respective articles to be labelled.

Particularly widespread are also labels of the tubular kind, known as "sleeve labels" and obtained starting from a web of heat-shrinking film wound in form of a continuous strip around one or more storage reels; the sleeve labels are applied with a certain clearance on the respective articles and then heated in an oven to obtain their shrinking and perfect adhesion to the lateral surfaces of the articles themselves. These types of labels do not require the use of glue.

Regardless of the type of label used, a known labelling machine typically comprises:

- a carousel rotatable around a vertical axis and configured to convey a plurality of articles along an horizontal, arc-shaped labelling path;
- an inlet station, at which the articles to be labelled are received by the carousel;
- an outlet station, at which the labelled articles exit the carousel; and
- a labelling module, peripherally arranged relatively to the carousel and configured to prepare, transport and feed a plurality of labels to the carousel at an application station, in order to apply such labels to respective articles.

According to a well-known configuration, a labelling module typically comprises:

- one or more storage units, for example reels or spools around which the web of labelling material is initially wound in form of a continuous strip;
- a feed roller for unwinding the web off the relative reel and advance it along a feed path;
- a plurality of support rollers, which support, in use, the web progressively unwound from the reel and guide it, in use, along the feed path;
- a cutting unit for repeatedly cut the web at a cutting station so as to separate a sequence of labels from the web itself; and
- a label transfer device, for example a known vacuum drum configured to receive, retain and advance each label and to feed each label to the carousel, at the application station.

In particular, the vacuum drum is rotatable about a (typically vertical) rotation axis and in a direction of rotation and is configured to receive the labels, to retain them by means of suction and, after a rotation by a determined angle about its axis, to release these labels to the application station, so that they are applied onto the respective articles advanced by the carousel.

Furthermore, in case glued labels are used, the labelling module comprises at least one gluing roller arranged substantially tangent to the vacuum drum, in a position operatively downstream of the cutting unit and upstream of the application station, with respect to the direction of rotation of the vacuum drum, for spreading glue onto at least the (leading and trailing) edges of each single label, prior to their application onto the relative articles.

According to a well-known configuration, rotary-type cutting units are generally used, which comprise:

- a first rotary member, usually a blade support roller (or "blade roller"), rotatable about a typically vertical first axis, carrying a blade or knife, and configured to convey the blade along a circular cutting path around the above-mentioned axis; and
- a second rotary member, usually a counter-roller carrying a counterblade element (or "counterblade roller"), rotatable about a second axis usually parallel to the first axis, arranged peripherally to the blade roller, so as to be substantially tangent to the cutting path, and configured to support the web of labelling material and convey it towards the cutting station, at which the web is cut by interaction of the blade with the counterblade element.

Typically, the counterblade roller defines an abutment surface for the blade and also a support roller for the web to be cut by the blade and for the web to be advanced along the feeding path, towards the vacuum drum.

To this end, in some known embodiments, the counterblade roller is provided with dedicated vacuum ports substantially similar to the vacuum ports of the vacuum drum and configured to apply vacuum to the web of labelling material supported thereon, so as to support the web and advance the newly cut labels towards the vacuum drum.

In use, by mutual rotation of the blade roller and the counterblade roller, the blade and the counterblade element are cyclically carried simultaneously at the cutting station, at which they cooperate with one another for cutting the web.

In practice, the web is interposed, in use and at the cutting station, between the blade roller and the counterblade roller, namely between the blade and the counterblade element.

Although the labelling modules of the type described above are functionally and structurally valid, the Applicant has observed that they are still open to further improvements, in particular as per:

- reducing the number of total components and simplifying the architecture: it is in fact necessary to precisely control the rotation of two rollers in the cutting unit and synchronize them with the rotation of the vacuum drum; it is also necessary to provide for suction on the counterblade roller, resulting in complicated canalization for the vacuum;

the flexibility and adaptability: in case of label format change, it is necessary to substitute the counterblade roller and to re-synchronize the counterblade roller, the blade roller and the vacuum drum; it is also necessary to vary the position of the feed roller relative to the counterblade roller, in order to adapt to the new size of counterblade roller and to maintain the optimal web tensioning for cutting.

DISCLOSURE OF INVENTION

It is therefore an object of the present invention to provide a labelling module which is designed to overcome at least one of the above-mentioned drawbacks in a straightforward and low-cost manner.

This object is achieved by a labelling module as claimed in claim 1.

BRIEF DESCRIPTION OF THE DRAWINGS

A non-limiting embodiment of the present invention will be described by way of example with reference to the accompanying drawings, in which.

BEST MODE FOR CARRYING OUT THE INVENTION

Figure 1:
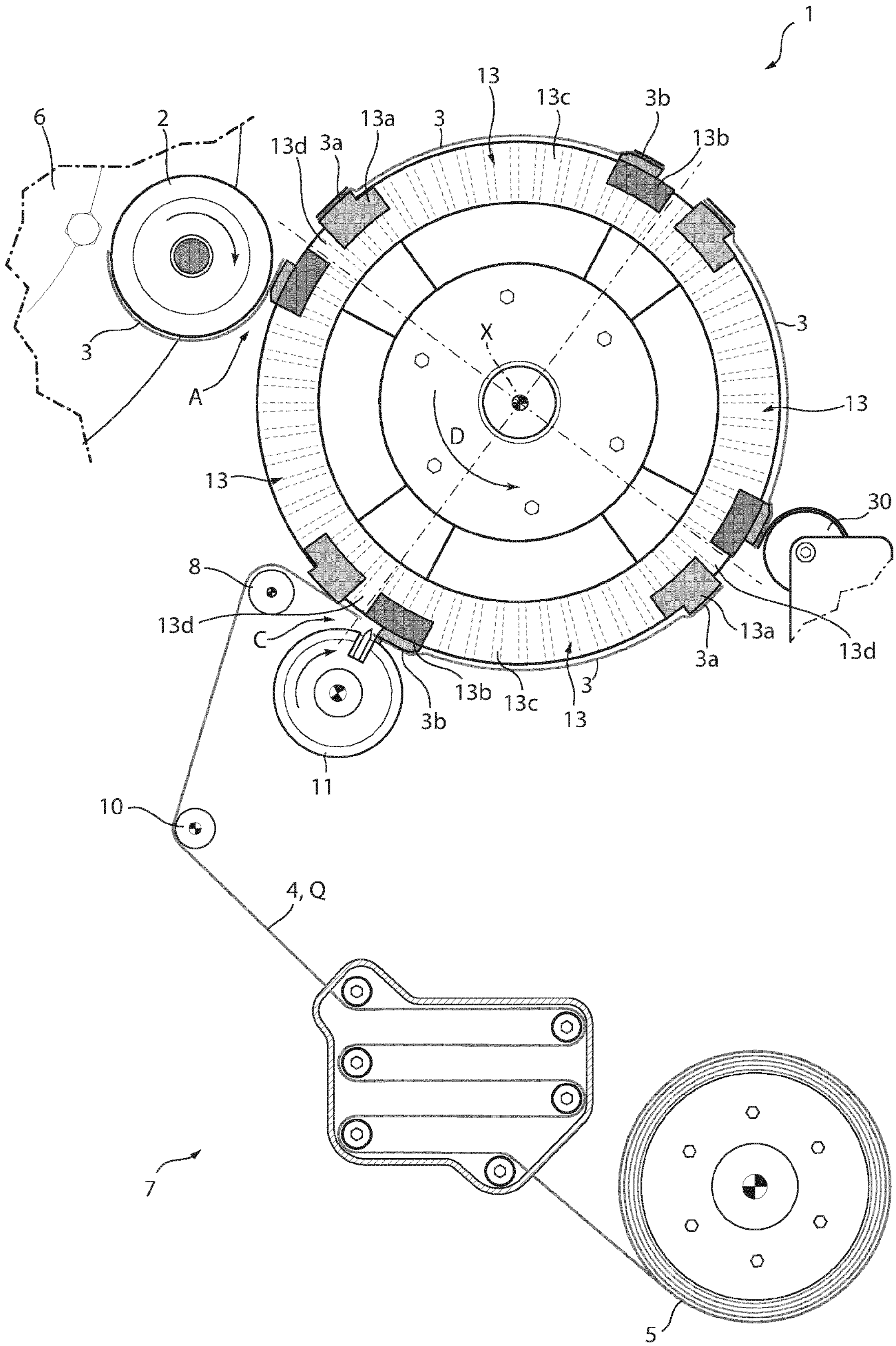
FIG. 1 is a schematic top view, with parts removed for clarity, of a labelling machine comprising a labelling module according to the present invention.

With reference to FIG. 1, number 1 indicates as a whole a labelling machine for labelling articles 2, such as bottles, flacons, cans or containers of this sort, adapted to contain a pourable product, preferably a pourable food product.

In particular, labelling machine 1 is configured to apply labels 3 obtained from a web 4 of labelling material onto articles 2.

According to this preferred and non-limiting embodiment, labels 3 are glued labels, i.e. strips of labelling material that are cut at predetermined lengths from web 4 and then sprinkled with glue before their application on the respective articles 2.

Preferably, web 4 is initially wound around one or more reels 5 (only one shown in FIG. 1) in the form of a continuous strip, and is progressively unwound, in use, off reel 5.

Preferably, labelling machine 1 is configured to apply so called "partial labels", i.e. labels 3 which cover an angular portion on the outer surface of the respective articles 2 measuring less than 360°, for example between 180° and 360°, as visible in FIG. 1.

As visible in FIG. 1, labelling machine 1 comprises:

- a conveyor device, preferably a carousel 6 rotatable around a fixed axis (not shown), preferably vertical, and configured to advance a plurality of articles 2 (only one of which is shown) along an arc-shaped labelling path, preferably horizontal;
- an inlet station (not shown), at which articles 2 to be labelled are fed to carousel 6;
- an outlet station (not shown), at which labelled articles 2 exit from carousel 6; and
- a labelling module 7 (only partially and schematically shown), arranged peripherally relatively to carousel 6 and configured to prepare and feed a plurality of labels 3 to the carousel 6 itself at an application station A, in order to apply labels 3 onto respective articles 2.

The articles can be containers, for example bottles.

Labelling module 7 comprises:

- a storage unit supporting, in rotatable manner, at least one reel 5;
- a feed roller 8 for advancing (i.e. feeding) web 4 along a feed path Q, and therefore for progressively unwinding web 4 from reel 5;
- a plurality of (idle) support rollers 10 (only one of which schematically shown), which support, in use, the web 4 progressively unwound from reel 5 and guide it along feed path Q;
- a cutting member 11 arranged downstream of feed roller 8, along feed path Q, and configured to repeatedly cut web 4 thereby separating a sequence of labels 3 therefrom; and
- a transfer drum 12, rotatable about a rotation axis X in an angular direction of rotation D, and configured to transfer labels 3 to application station A for the application thereof onto respective articles 2.

It is stated that feed path Q stretches from the reel 5 up to the application station A. In other words, feed path Q is a path along which web 4 is advanced, prior to the cutting thereof, and then along which labels 3 are advanced, after the cutting of web 4.

Preferably, drum 12 is defined by a vacuum drum of the known type, which retains labels 3 by means of suction, in a manner known and not described in detail. Drum 12 comprises a plurality of receiving sectors 13 each configured to cyclically receive and retain a respective label 3.

In particular, receiving sectors 13 are equipped with vacuum ports selectively arrangeable in fluid communication with a vacuum source, in a manner known and not described in detail.

Each receiving sector 13 includes a leading pad 13*a* for retaining a leading edge 3*a* of label 3 and a trailing pad 13*b* for retaining a trailing edge 3*b* of label 3.

Furthermore, each receiving sector 13 comprises an interpad region 13*c* which is angularly interposed between pads 13*a* and 13*b*.

In light of the above, each label 3 is retained by a receiving sector 13 of drum 12 with its leading edge 3*a* onto the respective leading pad 13*a*, with its trailing edge 3*b* onto the respective trailing pad 13*b*, and with its intermediate portion onto interpad region 13*c*.

In the specific example shown, drum 12 comprises four receiving sectors 13 which together define the outer lateral surface of drum 12.

In the example shown, each receiving sector 13 is configured to completely apply one label 3 at a time on a respective container 2.

More specifically, each label 3 is completely applied onto the respective container 2 by one single receiving sector 13, with trailing pad 13*b* applying the last portion, i.e. trailing edge 3*b*, of such label 3. The applied label 3 can be a partial label 3, which, at the end of the labelling operation, covers an angular sector of the container which has a value of less than 360°, for example 180°. The containers can be bottles. The angular sector is to be considered an angular sector of the lateral surface of the bottle and an angular sector around the axis of the bottle. In this case, the format of the label, and in particular the length of the label, is appropriately selected to obtain partial labels. The labelling module is therefore configured for labelling the containers by means of partial labels, partial 3 label being a label which, once each completely applied on the container or at the end of the labelling operation, covers an angular sector the value of which is lower than 360°, for example 180°. The labelling module 7 can be configured so that each label is completely applied on the respective container by means of the respective receiving sector, the leading pad 13*a* applying at least the leading edge 3*a* of the label and the trailing pad 13*b* applying at least the trailing edge 3*b* of the label 3. This "pad to pad" technique is in particular useful in case of the labels being partial labels. In particular, the labelling module can for example be also configured for labelling the containers by means of partial labels, each partial label covering an angular sector the value of which is lower than 30°, in which case the length of the label can be lower, for example, than 40 mm.

Labelling module 7 further comprises a gluing device, in particular a gluing roller 30, for applying glue onto the labelling material supported by drum 12, and more specifically onto the leading edge 3*a* and trailing edge 3*b* of each label 3 supported by the respective receiving sector 13.

Expediently, gluing roller is peripherally 30 arranged relative to drum 12 so as to be tangent to the outer lateral surface of each pad 13*a*, 13*b* for cyclically applying glue to the label portions resting, in use, thereon.

According to an aspect of the present invention, cutting member 11 is arranged adjacent to drum 12 and is configured for cutting web 4 on the drum 12 sequentially at the trailing pads 13*b*, thereby separating labels 3 from web 4. In this way, the format of the receiving sector 13 can be shorter along direction D, so that if a shorter format of the receiving sector 13 is needed to label the containers with partial labels, in particular by means of the above-mentioned pad to pad technique, it is not needed to carry out any complicated modification to the components which are used for cutting. Therefore a labelling module is provided which is preferably of the roll fed type and which is configured for labelling containers with partial labels and by means of a pad to pad technique. The labelling module is therefore more flexible with respect to the format of the labels.

Figure 2:
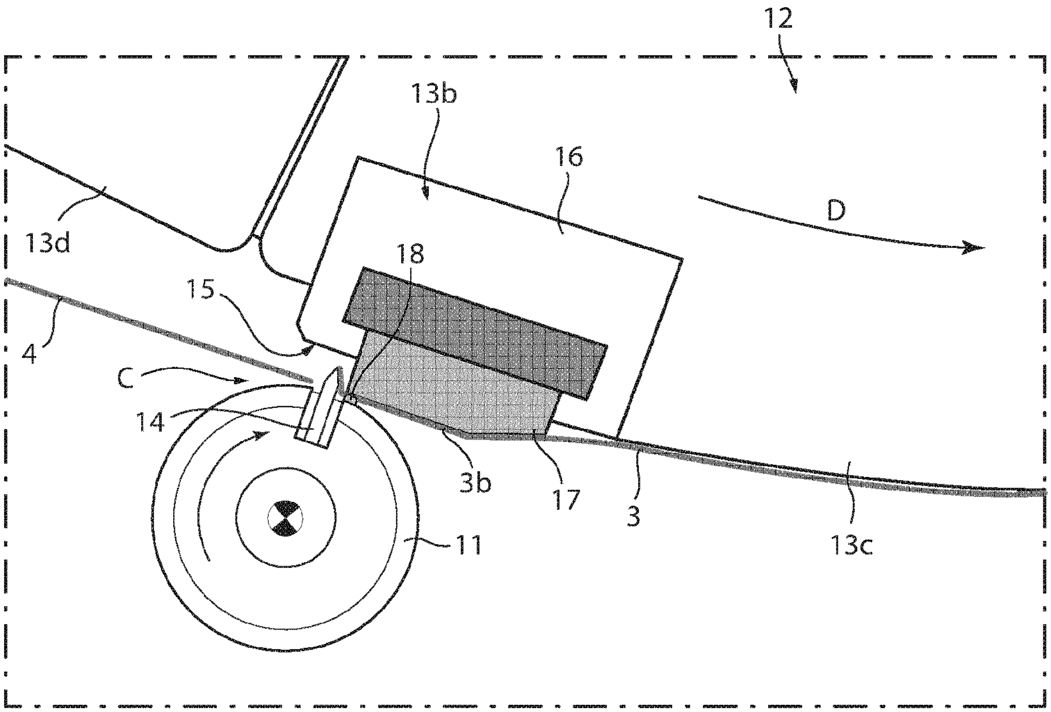
FIG. 2 is a larger-scale, schematic top view, with parts removed for clarity, of part of a transfer drum of a first preferred embodiment of the labelling module of FIG. 1.

In detail, as visible in FIG. 2, cutting member 11 has a blade element 14.

Drum 12 defines a plurality of surface elements 15, each surface element 15 being located at one respective trailing pad 3*b*. Each surface element is part of the respective sector 13. The cut occurs by means of the blade element 14 being positioned in front of the surface element 15.

In greater detail, cutting member 11 is configured to cut web 4 at a cutting station C.

According to the invention, cutting station C is cyclically defined between blade element 14 and a respective surface element 15.

In particular, cutting member 11 and transfer drum 12 are positioned at opposite sides of feed path Q and are actuatable to mutually convey blade element 14 and surface element 15 at cutting station C, at which blade element 14 and, sequentially, each respective surface element 15 are cyclically positioned at opposite sides of web 4, so that the cut of the web occurs by means of the blade element 14 being positioned in front of the surface element 15.

As visible in FIG. 2, each trailing pad 13*b* comprises a holding member 17 for retaining trailing edge 3*b* of the labels 3 and a frame member 16 for supporting such holding member 17.

According to this preferred embodiment, holding member 17 is fixed to frame member 16. In particular, for each trailing pad 13*b*, surface element 15 is located at frame member 16 in a position downstream of holding member 17, with respect to direction D and according to an observer which is not moving with the drum 12.

Hence, in use, the cutting of web 4 occurs while trailing edge 3*b* of the label 3 soon to be separated from web 4 lays onto holding member 17.

After the cut, such trailing edge 3*b* will then be retained by holding member 17, as shown in FIG. 2.

In this way, there is no need for an intermediate counterblade body, such as a counterblade roller.

Conveniently, each receiving sector 13 further comprises a prepad region 13*d* which is arranged adjacent to and upstream of the respective leading pad 13*a*, and configured for providing a region for the temporary sliding of web 4, i.e. of the free end flap of web 4, onto the outer lateral surface of drum 12.

In detail, according to a known manner, in use and for each receiving sector 13, the free end flap of web 4 slides onto prepad region 13*d* until it is grasped and retained by leading pad 13*a*.

Then, web 4 is progressively grasped and retained by interpad region 13*c* and, eventually, by trailing pad 13*b*. At this point, blade element 14 and the respective surface element 15 mutually reach cutting station C, so that the cut of web 4 and the separation of label 3 is performed.

According to the non-limiting preferred embodiment shown, cutting member 11 is of the rotary type and comprises a cutting roller 11 rotatable about a central axis for carrying blade element 14 in rotation along a circular cutting path.

Alternatively, cutting member 11 could be of the reciprocating type. In this case, blade element 14 is movable in a reciprocating manner towards and away from drum 12, to perform the cutting of web 4.

Thanks to the above configuration, flexibility and adaptability of labelling module 7 is largely improved. In fact, in case of label format change, at constant production speed, it is sufficient to adapt the drum 12 to adapt labelling module 7 to the new size and/or number of receiving sectors 13 on drum 12.

Hence, no complicated, cumbersome and time-consuming disassembling and re-assembly of cutting unit is needed.

Moreover, the number of total components is reduced, as no separate counterblade roller is provided, and architecture is simplified, as no additional vacuum canalization for such counterblade roller is needed.

Advantageously, feed roller 8 is located radially adjacent to drum 12 at cutting station C.

The Applicant has observed that such advantageous positioning of feed roller 8 in proximity of drum 12 is possible thanks to the cutting of web 4 being performed directly onto each trailing pad 13*b* of drum 12, as described above.

Accordingly, the Applicant has further noted that such advantageous positioning of feed roller 8 increase the flexibility in treating labels 3 of different lengths; for example, labels 3 of small length can be treated, thanks to the better tensioning provided by such advantageous positioning of feed roller 8.

Advantageously, each receiving sector 13 is coupled to drum 12 in a removable manner, so as to be interchangeable with a receiving sector 13 of a different type upon a label format change, such type being variable depending on the format of labels 3 to be applied. Therefore also the number of sectors 13 can be varied as a function of the label format or length.

Hence, each trailing pad 13*b*, as well as each leading pad 13*a*, interpad region 13*c* and prepad region 13*d*, is interchangeable together with the respective receiving sector 13.

Therefore, each surface element 15 is interchangeable together with the respective trailing pad 13*b*.

In light of the above, the area of trailing pads 13*b* onto which the cutting of web 4 is performed, is interchangeable upon label format change.

Advantageously, cutting member 11 further comprises a stopping element 18 located in a position adjacent to blade element 14 and configured to abut against (each) trailing pad 13*b* for temporarily preventing a movement of web 4 along feed path Q during cutting thereof.

In use, just before and during cutting of web 4 by blade element 14, stopping element 18 is configured to abut against holding member 17, with the interposition of trailing edge 3*b* of the label 3 soon to be separated from web 4. The stopping element 18 is upstream of the blade element 14, according to the sense of rotation of the cutting member 11 and to an observer whish is not moving with the cutting member 11.

Conveniently, stopping element 18 is arranged operatively upstream of blade element 14 during cutting of web 4, with respect to direction D.

Preferably, stopping element 18 is made of an elastomeric material, for example rubber.

The Applicant has noted that stopping member 18 increases local tensioning of web 4 during cutting thereof, thereby easing the cut and improving the quality thereof.

Figure 3A:
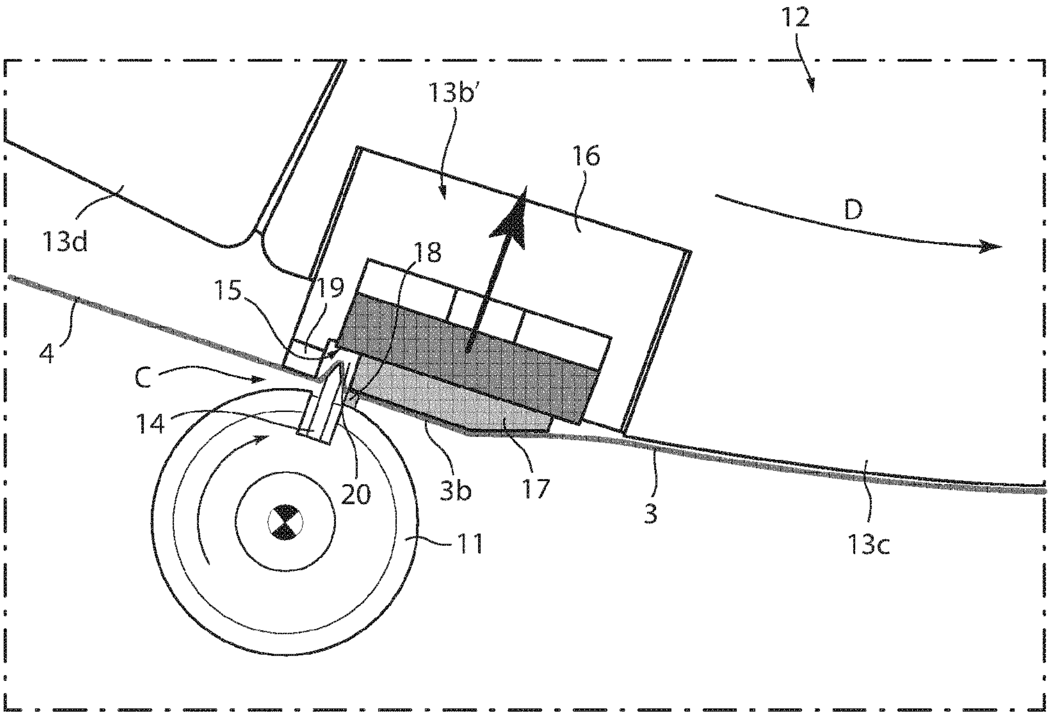
FIGS. 3*a* and 3*b* are larger-scale, schematic top view, with parts removed for clarity, of a second preferred embodiment of the part of the transfer drum of of FIG. 2, during two distinct operative conditions.
Figure 3B:
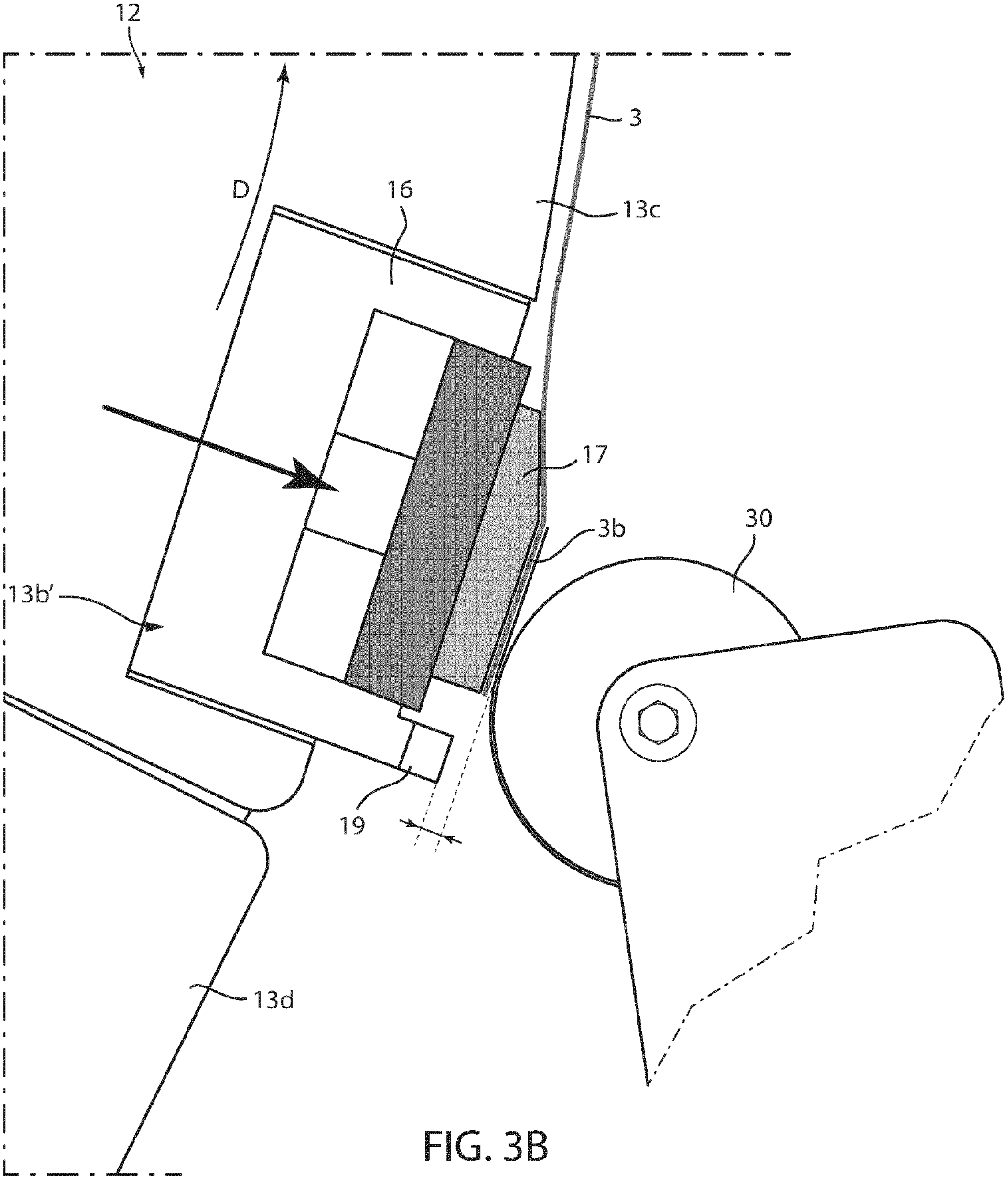

Referring now to FIGS. 3*a* and 3*b*, it is indicated with number 13*b*' a further embodiment of trailing pads of drum 12 of the labelling module 7 according to the present invention.

Since each trailing pad 13*b*' is similar to trailing pads 13*b* described above, only the differences between the two are described hereinafter, using the same reference numerals for similar or corresponding parts.

According to this further embodiment, each trailing pad 13*b*' advantageously includes a support element 19 radially protruding from frame member 16 at a position downstream of holding member 17, with respect to direction D and according to an observer which is not moving with the drum 12, and configured to support web 4 during cutting thereof, as visible in FIG. 3*a*.

In particular, support element 19 is located at a trailing end of trailing with respect to direction D. The support element 19 is part of the respective sector 13.

Advantageously, for each trailing pad 13*b*', surface element 15 is located between the respective holding member 17 and the respective support element 19. Each support element 19 is part of the respective receiving sector 13.

In detail, support element 19 is located at a non-zero angular distance from holding member 17 so that a recess or slot 20 is defined between support element 19 and holding member 17. In such a case, recess 20 is cyclically covered by web 4. Hence, recess 20 is arranged adjacent to and downstream of holding member 17, with respect to direction D and according to an observer which is not moving with the drum 12, and adjacent to and upstream of support element 19.

In greater detail, cutting member 11, and particularly blade element 14, is configured to cyclically engage recess 20 for cutting web 4 thereat.

Thanks to this configuration, a cleaner cut of web 4 can be performed, since the local tensioning of web 4 is improved with respect to the previous case.

Stopping element 18, if present, further improves local tensioning of web 4. Blade element 14 engages recess 20 without abutting against the back wall of recess 20, thereby defining a "cut in slot". In this way, wear of blade element 14 and of drum 12 is reduced.

Advantageously, for each trailing pad 13*b*', support element 19 is rigidly fixed on frame member 16 and holding member 17 is radially movable with respect to frame member 16 (and axis X) between:

- a retracted position, in which it is preferably substantially radially flush with support element 19, in particular for performing the cutting operation (FIG. 3*a*); and
- an extracted position, in which it radially protrudes more than support element 19, in particular for the application of glue on trailing edge 3*b* (FIG. 3*b*).

In the retraced position and the extracted position are such that in the extracted position the holding member 17, with respect to the support element 19, protrudes radially more than in the retracted position.

This configuration provides for a twofold technical effect: on one hand, cutting member 11 can be arranged closer to drum 12, which increases compactness of labelling module 7 and provides for a more precise cut; on the other hand, during application of glue onto trailing edge 3*b* by means of gluing roller 30, an undesired sprinkling of glue onto support element 19 (and into recess 20) can be avoided.

Accordingly, labelling module 7 is advantageously configured so that holding member 17 is controlled in the retracted position during cutting and in the extracted position at least during application of glue onto the trailing edge 3*b* of the label 3 retained by the respective trailing pad 13*b*'.

In the example shown, gluing roller 30 is arranged downstream of cutting member 11, relative to direction D.

Under certain conditions, if the application of glue is performed after cutting, some glue residues can reach the prepad region 13*d* which immediately follows and which at that time will be uncovered from any labelling material.

To this end, according to an alternative embodiment not shown, and thanks to the fact that the cutting of web 4 is performed directly on drum 12, gluing roller 30 is advantageously interposed, with respect to direction D, between feed roller 8 and cutting member 11.

This configuration prevents undesired residues of glue from accumulating on each prepad region 13*d*, since at the time of glue application the relative portion of web 4 which will define the following label 3 is not yet cut and separated by web 4 and thereby covers the following prepad region 13*d*.

The advantages of labelling module 7 according to the present invention will be clear from the foregoing description.

In particular, flexibility and adaptability of labelling module 7 is largely improved. In fact, in case of label format change, no complicated modifications are needed to adapt the cutting components. In particular, the labelling machine can be better configured for labelling containers by means of partial labels. A partial label is a label which, once completely applied on the container, covers an angular sector of the respective container which is less than 360°, like for example 180°. Therefore, for the same container, a partial label is shorter with respect to a not partial label. A shorter label requires a shorter angular length of each receiving sector 13 along the direction D. The cutting on the transfer drum 12 allows for having a shorter receiving sector 13 without complicated modifications to the cutting components. The use of a partial label, which as said above can be considered a shorter label, can be also associated to the labelling machine being configured so that each label is completely applied on the respective container by means of the respective receiving sector. In this case, the leading pad 13*a* applies at least the leading edge 3*a* of the label of the label and the trailing pad 13*b* applies at least the trailing edge 3*b* of the label. Therefore, a labelling machine is provided, which, thanks to the cutting member 11 cutting the web on the drum 12, is in particular configured for labelling the containers with partial labels and by means of a "pad to pad" technique.

Furthermore, the number of total components is reduced, as no separate counterblade roller is provided, and architecture is simplified, as no additional vacuum canalization for such counterblade roller is needed.

In addition, upon label format change the position of feed roller 8 relative to drum 12 can be maintained constant, as the only thing that has to vary is the angular speed of cutting member 11 (or reciprocating speed in case of reciprocating cutting member 11).

Moreover, feed roller 8 can be placed peripherally and radially adjacent to drum 12, thereby improving the tensioning of web 4 which ultimately results in an improved quality of cut.

Furthermore, in case that trailing pads 13*b*' are used, tensioning of web 4 during cut is further improved and cutting member 11 can be placed closer to drum 12, without however increasing the risk of undesired glue residues on support element 19.

Clearly, changes may be made to labelling module 7 as described herein without, however, departing from the scope of protection as defined in the accompanying claims.

The invention claimed is:

1. A labelling module for labelling containers adapted to contain a pourable product, the labelling module comprising:

a feed roller for advancing a web of labelling material along a feed path;

a cutting member arranged downstream of the feed roller, along the feed path, to repeatedly cut the web, thereby separating a sequence of labels therefrom; and a transfer drum rotatable about a rotation axis in an angular direction of rotation, the transfer drum configured to transfer the labels to an application station for application of the labels onto respective containers;

wherein the transfer drum comprises a plurality of receiving sectors each configured to cyclically receive and retain a label, the receiving sectors each comprising a leading pad that retains a leading edge of the label and a trailing pad that retains a trailing edge of the label, and wherein the cutting member is arranged radially adjacent to the transfer drum and cuts the web on the drum sequentially at the trailing pads, thereby separating the labels from the web;

wherein the cutting member comprises a blade element and the transfer drum comprises a plurality of surface elements, wherein each of the surface elements is located at one respective trailing pad and is part of the respective receiving sector; wherein the cutting member cuts the web at a cutting station, the cutting station being cyclically defined between the blade element and a respective surface element; and wherein the cutting member and the transfer drum are positioned at opposite sides of the feed path and are actuatable to mutually convey the blade element and the surface elements at the cutting station, at which the blade element and, sequentially, each respective surface element are cyclically positioned at opposite sides of the web, so that the cut of the web occurs by means of the blade element being positioned in front of the surface element;

wherein each trailing pad comprises a respective holding member for retaining the trailing edge of the label and a respective frame member for supporting the holding member; and wherein, for each trailing pad, the surface element is located at the frame member in a position downstream of the holding member, with respect to the angular direction of rotation and according to an observer which is not moving with the drum; and wherein each trailing pad further includes a respective support element radially protruding from the respective frame member at a position downstream of the holding member, with respect to the angular direction of rotation and according to an observer which is not moving with the drum, wherein the support element is configured to support the web during cutting thereof and is part of the respective sector, wherein the surface element is located between the holding member and the support element; wherein the support element is located at a non-zero angular distance from the holding member so that a recess is defined between the support element and the holding member; and wherein the cutting member is configured to cyclically engage the recess for cutting the web thereat.

2. The labelling module as claimed in claim 1, and further comprising: a gluing device for applying glue onto the leading edge and trailing edge of each label supported by a respective receiving sector.

3. The labelling module as claimed in claim 2, wherein, for each trailing pad, the support element is rigidly fixed on the frame member, and the holding member is radially movable with respect to the frame member between:

a retracted position, in which the holding member is preferably substantially radially flush with the support element; and an extracted position, in which the holding member radially protrudes more than in said retracted position with respect to the support element.

4. The labelling module as claimed in claim 3, wherein the gluing device is arranged downstream of the cutting member, relative to the angular direction of rotation; wherein the labelling module is configured so that the holding member is controlled in the retracted position during cutting and in the extracted position at least during application of glue onto the trailing edge of the label retained by the respective trailing pad.

5. The labelling module as claimed in claim 2, wherein the gluing device is interposed, with respect to the angular direction of rotation, between the feed roller and the cutting member.

6. The labelling module as claimed in claim 1, wherein the cutting member further comprises a stopping element adjacent to the blade element and configured to abut against the trailing pad for temporarily preventing a movement of the web along the feed path during cutting thereof.

7. The labelling module as claimed in claim 6, wherein the stopping element is arranged operatively upstream of the blade element during cutting of the web, with respect to the direction of rotation and according to an observer which is not moving with the cutting member.

8. The labelling module as claimed in claim 1, wherein the labelling module labels the containers by means of partial labels, each partial label being a label which, once completely applied on the container or at the end of the labelling operation, covers an angular sector of the external lateral surface of the container, wherein the value of the angular sector is lower than 360°.

9. The labelling module as claimed in claim 1, wherein the labelling module labels the containers using partial labels, each partial label being a label which, once completely applied on the container or at the end of the labelling operation, covers an angular sector of the external lateral surface of the container, wherein the value of the angular sector is lower than 30°.

10. The labelling module as claimed in claim 1, wherein the support element is located at a trailing end of the trailing pad, with respect to the angular direction of rotation.

11. The labelling module as claimed in claim 1, wherein the feed roller is located radially adjacent to the transfer drum.

12. The labelling module as claimed in claim 1, wherein each receiving sector is coupled in a removable manner to the transfer drum so as to be interchangeable with a receiving sector of a different type and variable depending on the format of the labels to be applied, so that the number of receiving sectors can be changed; and wherein each trailing pad with the respective surface element are interchangeable together with the respective receiving sector.

13. The labelling module as claimed in claim 8, wherein the labelling module is configured so that each label is completely applied on the respective container by means of a respective receiving sector, the leading pad applying at least the leading edge of the label and the trailing pad applying at least the trailing edge of the label.

14. A labelling machine for labelling containers adapted to contain a pourable product, the labelling machine comprising:

a conveyor for advancing the containers to be labelled; and a labelling module as claimed in claim 1 and peripherally arranged relative to the conveyor;

the labelling machine comprising a cutting unit which includes the cutting member and the transfer drum.

* * * * *